No. 707,415. Patented Aug. 19, 1902.
H. H. HIGHAM.
CELLULAR PACKING STRUCTURE.
(Application filed June 27, 1900.)
(No Model.)

Witnesses:-
Frank L. A. Graham.
Louis M. F. Whitehead

Inventor:
Howard H. Higham.
by his Attorneys:-
Howson & Howson

UNITED STATES PATENT OFFICE.

HOWARD H. HIGHAM, OF PHILADELPHIA, PENNSYLVANIA.

CELLULAR PACKING STRUCTURE.

SPECIFICATION forming part of Letters Patent No. 707,415, dated August 19, 1902.

Application filed June 27, 1900. Serial No. 21,801. (No model.)

*To all whom it may concern:*

Be it known that I, HOWARD H. HIGHAM, a citizen of the United States, residing in Philadelphia, Pennsylvania, have invented certain Improvements in Cellular Packing Structures, of which the following is a specification.

The object of my invention is to so make cellular or divisional packing structures for bottles and the like as to reduce the cost of the same without impairing their quality, an object which I attain in the manner hereinafter set forth, reference being had to the accompanying drawings, in which—

Figure 1:
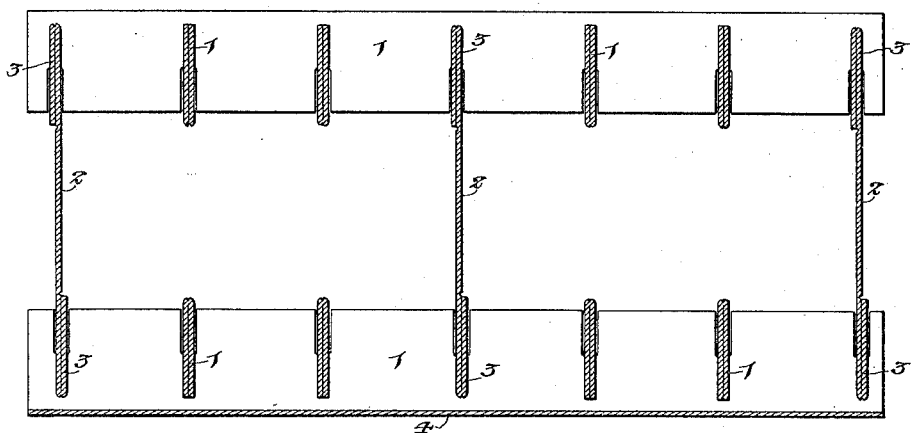
Figure 2:
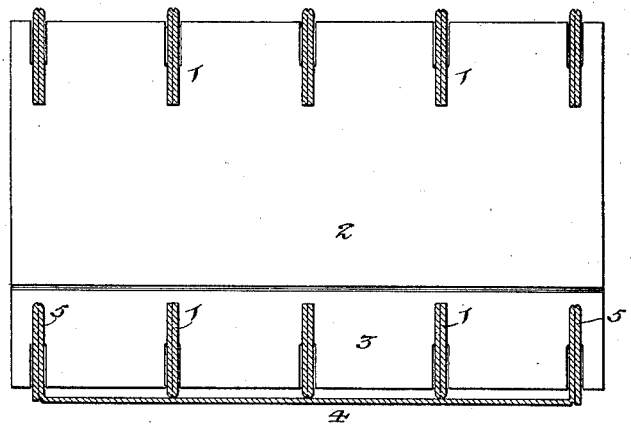

Figure 1 is a longitudinal section of a cellular packing structure for bottlers, &c., made in accordance with my invention; and Fig. 2 is a transverse section of the same.

In making a certain class of cellular structures for storing or transporting bottles and like objects it is common to have an upper and a lower series of cells connected together at suitable intervals, so as to be properly supported in their respective positions, and heretofore it has been customary to make the upper and lower cellular portions and the connecting portions of the same weight of material, the connecting-strip and the corresponding element of the upper and lower cellular portions of the structure being, in fact, cut from a single piece of pasteboard or strawboard. I have ascertained by experiment that the strips which connect the upper and lower cellular portions of the structure need not of necessity be as heavy as the material of which the strips themselves are composed, much thinner material being available for connecting purposes without materially impairing the durability or usefulness of the structure. Thick strawboard is much more expensive, weight for weight, than thinner strawboard. Hence in carrying out my invention I use the latter quality of strawboard both for the connecting portions of the structure and for the strips of which the cellular portions are composed, uniting two or more thicknesses of this thin strawboard in order to secure in said strips for the cellular portions of the structure the desired thickness of material. This is preferably done by cutting a sheet of the thin material into strips which are centrally scored, glued, and folded by a suitable machine, which may also notch the strips in order that they may be interlocked one with another to form the cellular portions of the structure. In Fig. 1 of the drawings such folded strips are represented at 1 in the formation of the upper and lower cellular portions of the structure, while at 2 are represented the connecting portions, having their top and bottom edges folded and cemented together, as at 3, so as to give them the strength necessary for constituting an element of the cellular portions of the structure. Where the structure is provided with a bottom sheet 4, the latter may have upturned and folded edges, as at 5, so as to constitute strips of the desired thickness and strength to form parts of the lower cellular portion of the structure.

Instead of scoring and folding the thin material in order to form the strips for the cellular structure the strips may be independent of each other, but suitably cemented together, the scored and folded strips being preferred, however, because of the greater facility with which they can be manufactured.

Having thus described my invention, I claim and desire to secure by Letters Patent—

1. A cellular structure consisting of upper and lower cellular portions composed of interlocking cross-strips and connecting portions of less thickness than the strips in said cellular portions, the upper and lower portions of said connecting-strips being doubled and cemented together throughout the extent of the doubled portion in order to impart to them the thickness necessary for the strips of the cellular structures, substantially as specified.

2. A cellular packing structure composed of interlocking cross-strips each consisting of two or more thicknesses of material cemented together throughout their extent and a bottom sheet having upturned and folded edges also cemented together throughout the extent of the fold, and each constituting one of the strips of the cellular portion of the structure, substantially as specified.

In testimony whereof I have signed my name to this specification in the presence of two subscribing witnesses.

HOWARD H. HIGHAM.

Witnesses:
F. E. BECHTOLD,
JOS. H. KLEIN.